United States Patent [19]
Boland

[11] Patent Number: 5,725,105
[45] Date of Patent: Mar. 10, 1998

[54] RACKS AND CARRIERS FOR CD-CASES

[76] Inventor: Brian Timothy Boland, 6 Plowman Place, Flynn Act 2615, Australia

[21] Appl. No.: 551,485

[22] Filed: Nov. 1, 1995

[30] Foreign Application Priority Data

Nov. 1, 1994 [AU] Australia ................... PM9158
May 26, 1995 [AU] Australia ................... 20312/95

[51] Int. Cl.$^6$ ................................. A47G 29/00
[52] U.S. Cl. ....................... 211/40; D6/407; D6/629
[58] Field of Search ................ 211/40, 41; 206/307, 206/308.1, 308.3, 309, 387.12, 387.13, 387.15; 312/9.1, 9.3, 9.9, 9.11, 9.19, 9.26, 9.27, 9.47; D6/407, 627, 628, 629, 630

[56] References Cited

U.S. PATENT DOCUMENTS

| | | | |
|---|---|---|---|
| 1,069,294 | 8/1913 | Rose | 211/40 X |
| 4,664,261 | 5/1987 | Frodelius | 206/387 |
| 4,932,522 | 6/1990 | Milovich | 206/309 |
| 5,097,946 | 3/1992 | Emrich | 206/45.11 |
| 5,183,177 | 2/1993 | Yu | 206/308.1 X |
| 5,344,028 | 9/1994 | Angele | 211/40 |
| 5,346,074 | 9/1994 | Overholser | 211/40 |
| 5,370,244 | 12/1994 | Peng | 211/40 |
| 5,515,979 | 5/1996 | Salvail | 211/40 |

FOREIGN PATENT DOCUMENTS

| | | | |
|---|---|---|---|
| 2059376 | 7/1992 | Canada | 206/308.1 |
| 490671 | 6/1992 | European Pat. Off. | 206/308.1 |

*Primary Examiner*—Leslie A. Braun
*Assistant Examiner*—Sandra Snapp
*Attorney, Agent, or Firm*—Foley & Lardner

[57] ABSTRACT

A CD storage rack and carrier are disclosed for use in storing CD-cases and presenting them for use. The rack 40 (FIG. 3) is an open-fronted rectilinear frame or cabinet 42 with a series of horizontal guide rails 50 on the inside face of each side panel 44 to slidably locate a stack of carriers 52, each carrier being adapted to mount one CD-case 10. Each carrier has a front thumb-tab 54 and is in the form of a tray having a base platform 56, raised side-guides 58 and rear hook-shape stops 60. Tab 54 also forms an integral rear-facing catch 62 adapted to engage the front lip 24 of CD-case 10*a*. Side-guides 58, rear stops 60 and front catch 62 act together to releasibly retain a CD-case in accurate location on carrier 52. Short, upstanding side walls 64 are formed at the rear of carrier tray 56 to support the carrier in cantilever fashion from guide rails 50. A pair of side-arms 70 joined together by a cross-bar 72 are pivotally mounted on trunnions 68 for resiliently gripping the CD-case therebetween. A protrusion 74 is formed on the inside face of each side-arm 70 for engaging the corresponding rear side-slot 36 of lid 12 of CD-case 10*a*.

The engagement of lid 12 of CD-case 10*a* by side-arms 70, and the pivoting of the side arms about the hinge axis of a case retained by a carrier (the hinge-axis being coincident with the axis of trunnions 68), allows arms 70 to be used to effect the automatic opening of the case lid 12 when the carrier is pulled forward to its access position. This is achieved in this example by contact between a striker-pin 74 on the rear end of each arm 70 and a coacting ramp-like abutment 76 located between rails 50 on cabinet 42. Other mechanisms for automatically opening the CD-case are disclosed. A CD-rack in which the carriers and their CD-cases are arranged vertically is also disclosed. Claims are made to these configurations of racks and to carriers for use therein.

8 Claims, 13 Drawing Sheets

RACKS AND CARRIERS FOR CD-CASES

TECHNICAL FIELD

This invention relates to CD storage racks in which the CDs are stored in their cases in or on trays or drawers (herein called 'carriers') which allow a selected case to be withdrawn to an access position and opened without having to remove the carrier from the rack. In preferred forms of the invention, the CD cases open automatically when their carriers are withdrawn to the access position. The racks may be used for the storage and presentation of music, data and video CDs, computer-related CDs such as CD-ROMs (CD-read only memory), CDIs (CD-interactive), WORM CDs (write once read many times CDs) and other recordable CDs. This invention relates to carriers for use in such storage systems as well as the racks or the system as a whole.

BACKGROUND TO THE INVENTION

While CD storage racks of the type indicated are known, they all have problems of ease of use, storage-efficiency, cost and/or functionality. A rack in which the CD-cases are opened automatically when their horizontally-disposed carriers are moved to the access position is disclosed by U.S. Pat. No. 4,932,522 to Milovich. Here, a CD-case is loaded into a carrier (which is in the access position) by pressing it downwards so that its body engages—and is retained by—front and back pairs of clips secured to the carrier. A top frame-like member, which is pivoted to the carrier at its rear about a horizontal axis, is then swung down over the lid of the CD-case and four vertical tabs which depend from the sides of the top frame-like member are then levered away from the sides of the case-lid so that small horizontal protrusions on the inside faces of the tabs can be inserted into respective slots preformed in the sides of a standard CD jewel-case lid. The front of the top frame-like member is spring-biased upward around its pivot axis so that, when the carrier is pushed back toward its storage position, the frame-like member contacts the carrier above and is deflected downwards to close (at least partially) the CD-case. This design has the disadvantage of a laborious and fiddly loading (and unloading) procedure, for it would be difficult to manipulate the short side-tabs without damage to them. Also, the return of a carrier (other than the bottom one) to its storage position appears to require manipulation of the spring-loaded member of the carrier below to avoid interference thereby.

U.S. Pat. No. 5,097,946 to Emrich also discloses the use of a drawer-like horizontal carrier on which the body of a CD-case is releasably clipped. Instead of gripping the case-lid in a frame, however, a wire is inserted transversely through the case-lid so that its ends project outwards through each of the rear pair of lid side-slots. The projecting ends of the wire are accommodated in slots formed in the sides of the frame of the rack, the slots being curved upwards at their front ends so that, when a carrier and its CD-case are withdrawn to the access position, the wire is moved upwards to effect the opening of the case-lid. Again, the loading and unloading of a CD-case is fiddly because of the need to enter the wire in the case-lid and then into the side slots of the frame. Moreover, since the wire must be located well forwards of the case-hinge, adjacent carriers must be widely spaced to allow for the large curve of the frame slots needed to properly open the CD-case; that is, storage density of such a rack is necessarily low.

U.S. Pat. No. 4,664,261 to Frodelius discloses (FIGS. 8–11) a storage system for CD-cases where each case is pressed into its carrier so as to be firmly gripped by a rear clip. When the carrier is withdrawn to its access position, the case-lid is then lifted manually to access the disc. Thus no lid-frame or other lid-lifting means is required. However, to hold the lid open at an angle, detents are provided on the sides or rear of the carrier to engage the respective parts of the lid. Manual pressure on the lid is sufficient to overcome the detents and return the lid to its closed position. U.S. Pat. No. 5,344,028 to Angele discloses a storage rack in which the carriers are stacked on a vertical post for pivoting rather than sliding movement. To access a desired CD, its carrier is swung around the post to bring it clear of its neighbours so that its CD-case can be opened manually. Neither of these systems allows for automatic opening of the cases. The system of Angele needs three or four times the volume of its stack to store its CD-cases. None of the prior art systems mentioned above are able to function with the CD-cases and carriers arranged vertically.

OBJECTIVES OF THE INVENTION

It is the general objective of the present invention to provide a rack for storing CD-cases which allows the cases to be readily and simply loaded and unloaded into the rack and yet allows a selected loaded CD-case to be presented for ready access to the CD. It is also desirable to provide a carrier for use in such CD-storage racks.

OUTLINE OF THE INVENTION

This invention is characterised by the use of a carrier having flexible strip-like side-arms adapted to resiliently engage between them the sides of the lid of a CD-case loaded into the carrier, the side-arms being adapted to assist the opening of the CD-case when the carrier is moved from a storage position within the rack frame to an access position in which the CD-case is positioned outside the rack frame.

The side-arms may be mounted in the carrier so that their rear ends can be pivoted around the hinge axis of a loaded CD-case from a first position corresponding to that of the lid of the CD-case when closed and a second position corresponding to that of the lid of the CD-case when open. The arrangement is preferably such that a CD-case may be simply loaded into the rack by pressing it rearwards into a carrier which is in the storage position and which has its arms in their first position. It is preferable to employ inwardly-facing protrusions on the front ends of the side-arms to engage the rear pair of lid side-slots of a case-lid, or to engage the bottom edge of the case-lid, so as to facilitate the use of the side arms to open the lid of a loaded CD-case.

The storage rack may be arranged so that the carriers and their CD-cases are slideable horizontally from their storage positions to their access positions, or it may be arranged so that they slide vertically. In the former case, it is preferable for the side-arms to be arranged to automatically open loaded CD-cases as they are moved from their storage positions to their access positions; in the latter case, it is preferable that the side-arms not be pivoted but that they form the sides of the carriers so that, when a carrier with a CD-case loaded therein is moved to the access position, the body of the CD-case can be rotated (manually or by gravity) away from its lid to allow access to the CD therein.

A CD-case loaded into a horizontal carrier may be automatically opened when withdrawn to the access position either by the use of springs or by arranging that the rear of the side-arms makes contact with an abutment on the sides of the frame. Where spring means are used, it may be convenient to employ a wire torsion spring on each side of the carrier and to form the side-arms from the forward arms of those springs, the afore-said protrusions being formed by suitably bending the front ends of the spring arms.

A CD-case retained by a horizontal carrier may be arranged to open automatically when the carrier is withdrawn to the access position. For this purpose, the body of the CD-case may be retained between a rear stop on the carrier and a front catch that engages the front lip of the case, and a side-arm may be employed to engage each side of the case-lid by means of a protrusion on its inside face which fits under the lower edge of the corresponding lid side-face or, more preferably, which fits in one of the slots in the lid side-face. The side-arms are preferably able to flex laterally and their protrusions are preferably shaped so that they will ride-up around a CD-case inserted between the side-arms until the protrusions are correctly positioned relative to the case-lid. Instead of protrusions on the arms, they may be arranged to spring onto the sides of the case to grip it frictionally. The side-arms may be spring-biased to open the case-lid as the carrier is withdrawn from the frame means, and/or they may be actuated by mechanical contact with coacting means on the cabinet (or frame means) to open the lid as the carrier and case are withdrawn to the access position. The side-arms may be pivotally mounted on the carrier.

Where the side-arms are actuated by contact with coacting means on the cabinet or frame, a variety of mechanisms is envisaged: striker pins on the arms may engage cam-surfaces or other abutments on the frame (or vice versa), gear segments on the arms may engage racks on the frame, trailing hooks attached to the arms may engage detents or holes in the frame. The side arms may be independent of one another and independently actuated by contact with its own coacting means, or they may be coupled together by a cross-bar or the like and actuated jointly. Where the side-arms are spring-biased, they may in fact be formed by the arms of torsion springs which are bent to form the protrusions. Alternatively, the springs may be separate from the side-arms and arranged to act upon them.

DESCRIPTION OF EXAMPLES

Having broadly portrayed the nature of the present invention, particular embodiments will now be described by way of example and illustration only. In the following description, reference will be made to the accompanying drawings in which.

Figure 1:
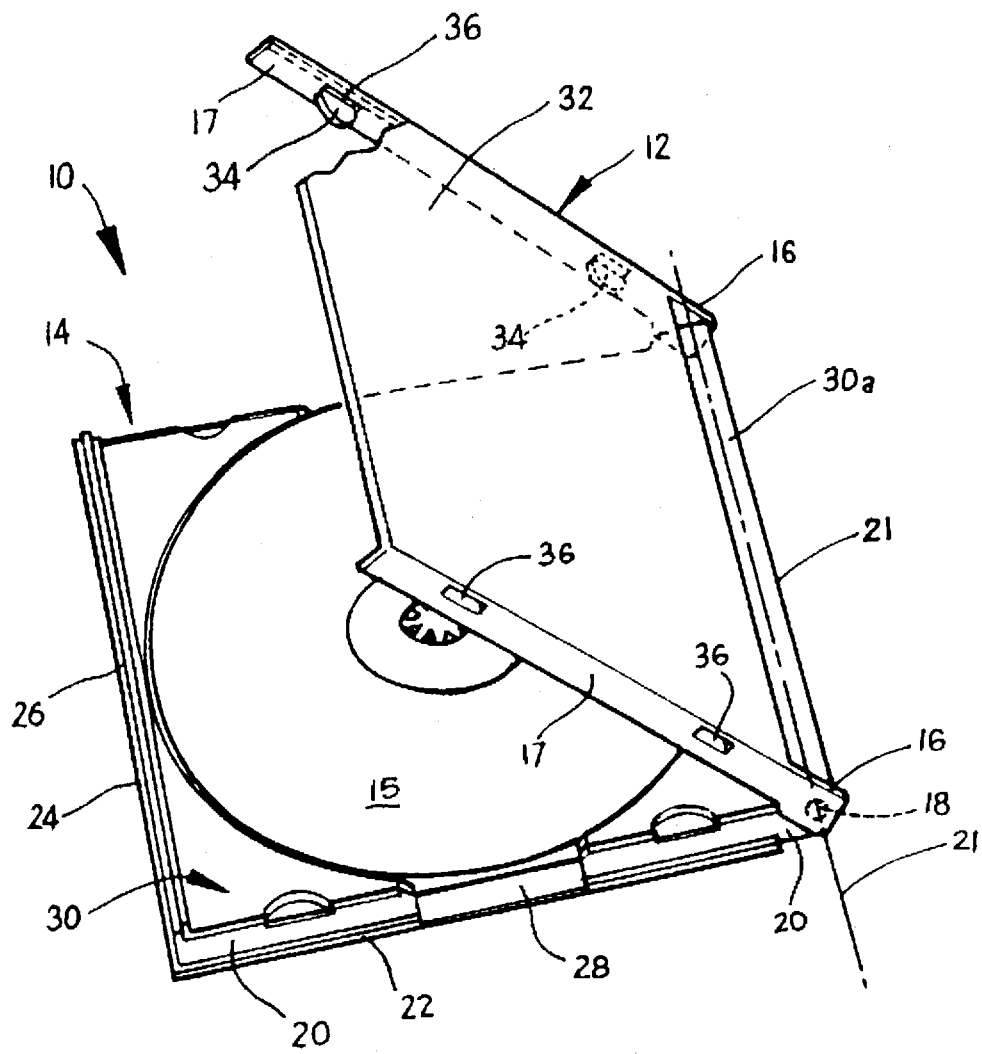
FIG. 1 is a perspective view of a CD-case in the open position.

Before describing the examples of the application of the principles of this invention, it is necessary to clarify—by reference to FIG. 1—the terms which will be used to refer to various parts of a standard CD-case. The CD-case 10 is a flat rectilinear box having a lid 12 and a body 14 formed by injection-moulding from transparent plastics material, the lid being hinged to the body at the rear or back thereof so that, in the open position (shown), access to the CD 15 resting in body 14 is provided from the front of the case. The hinging of lid 12 to body 14 is effected by the use of two short rearward extensions 16 of its side faces 17, extensions 16 having integrally moulded trunnions (generally indicated at 18) that snap into corresponding holes in the side faces 20 of body 14 near the back face 27 thereof. Since lid 12 is roughly square (in plan view), ignoring extensions 16, body 14—and the whole case 10—is substantially longer front-to-back than it is side-to side. The hinge axis 21 of the lid therefore extends transversely through the rear portion of body 14 so as to lie parallel to its shorter sides (ie, its front and rear faces 26 and 27 respectively). A side-lip 22 extends outwards (horizontally) along the bottom edge of side faces 20 of body 14 and a similar front-lip 24 is formed along the bottom corner of the front face 26 of body 14, side lips serving as stops for the bottom edges of side faces 17 of lid 12, when it is in its closed position. The central portion of each side face 20 of body 14 is cut away on both sides at 28 to facilitate the removal of CD 15 by the use of the finger and thumb of one hand.

A thin, usually black, plastics insert 30 is pressed into body 14 to locate CD 15 and to form the upper surface 30a of the case between extensions 16 of lid 12. A folded paper label (not shown) is normally laid between insert 30 and the bottom face of body 14 so that information printed thereon is visible through the front and back faces (26 and 27) as well as through the bottom face (not shown) of the body. To allow another label or booklet to be retained in lid 12 so that it is visible through its top face 32, a pair of protrusions 34 are formed on the inside of each lid side-face 17. To form protrusions 34 when injection-moulding lid 12, it is convenient to use a side-core shut-face detail that leaves a lid side-slot 36 between each protrusion 34 and the inside surface of lid top-face 32. While standard CD-cases may have two or three lip side-slots 36 on each side of a lid, the rear-most slots are located at the same fixed distance from the hinge-line 21.

Figure 2:
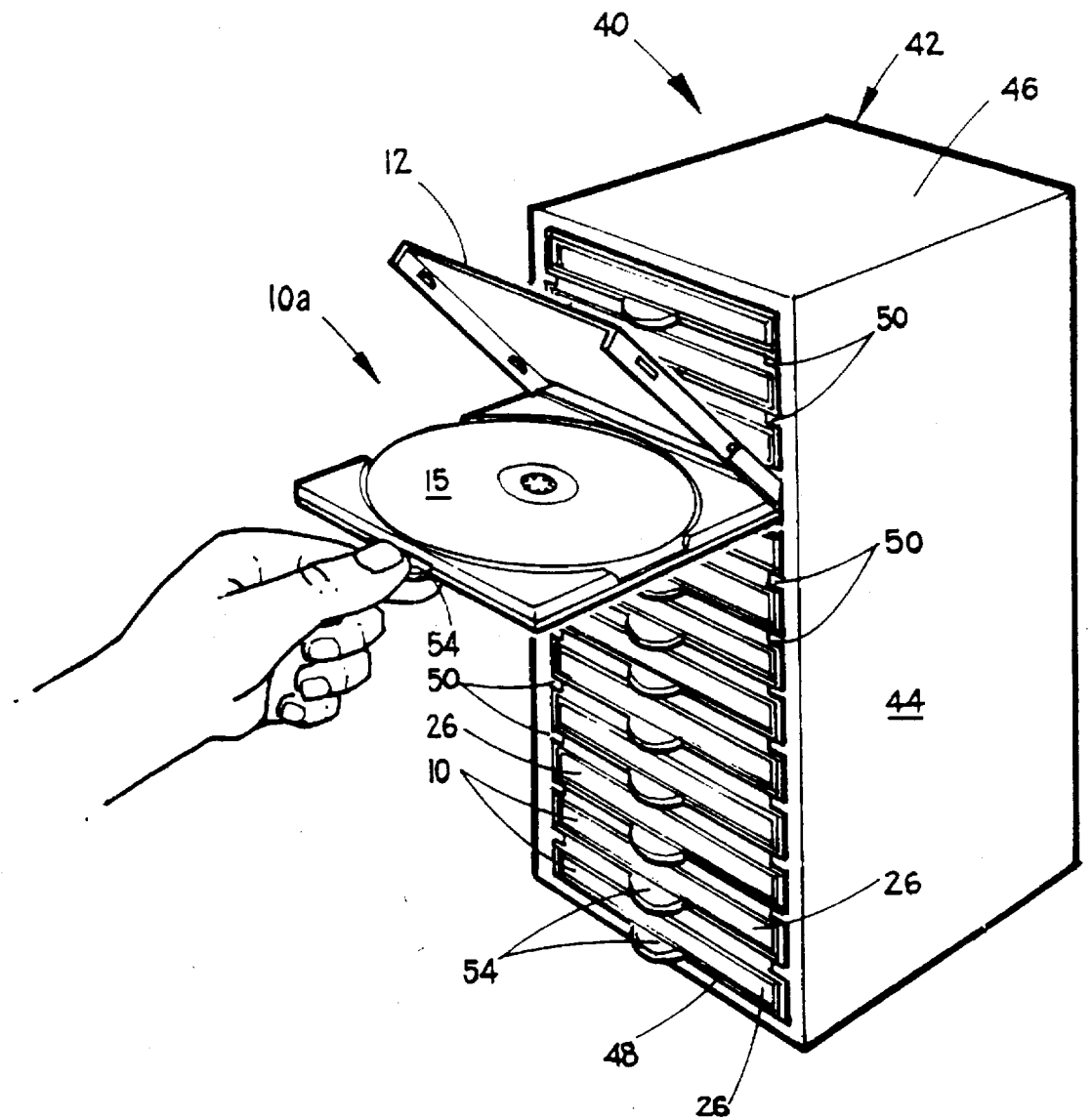
FIG. 2 is a general perspective of a vertical storage rack formed in accordance with this invention.
Figure 3:
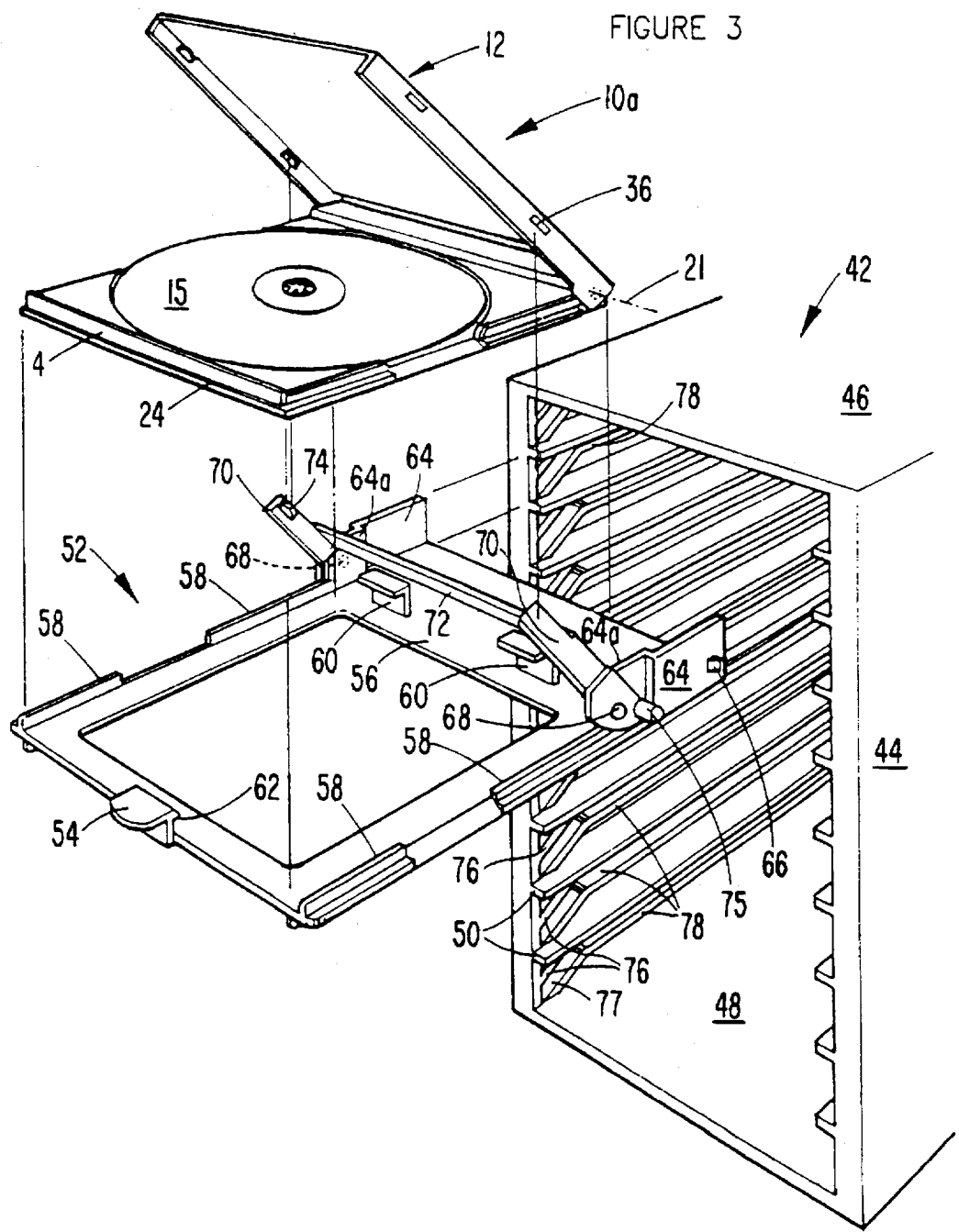
FIG. 3 is a exploded perspective detail of the first example of a carrier for use in the rack of FIG. 2.
Figure 4:
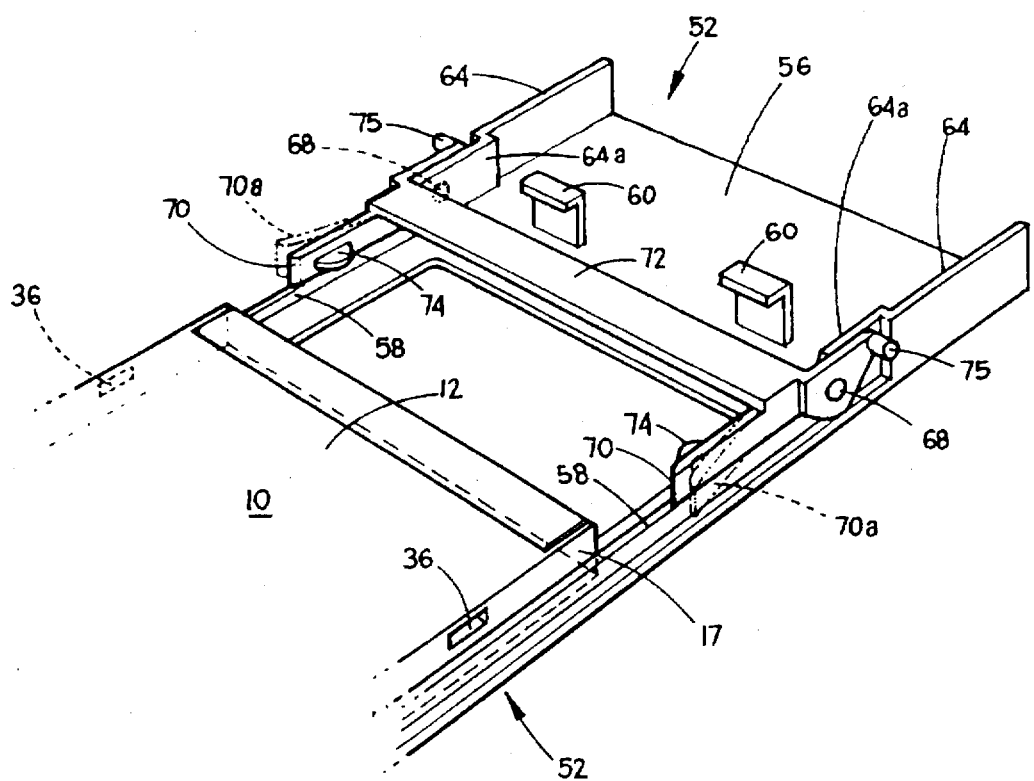
FIG. 4 is a perspective detail of portion of the carrier of FIG. 3 indicating the manner in which it engages a CD-case.

The first example of the application of this invention, shown in FIGS. 2, 3 and 4, comprises a CD-rack 40 which basically consists of an open-fronted rectilinear cabinet 42 (which serves as the frame in this example) formed from side, top and bottom panels 44, 46 and 48 respectively. A series of horizontal guide rails 50 for the carriers are formed on the inside face of each side panel 44 to slidably locate a stack of carriers 52 (FIG. 3), each carrier being adapted to mount one CD-case 10 so that the view of its front face (and label) is unobstructed. Each carrier has a front tab 54 by which it may be pulled forward or pushed rearward along guide rails 50. In FIGS. 2 and 3, a carrier 52 is shown in the access position with its case 10a open to provide access to CD 15, all other carriers of FIG. 2 with their CD-cases 10 being shown in the storage position in which only the front faces 26 (and labels) of the CD-cases are visible.

Turning to FIG. 3 in particular, each carrier 52 is in the form of a tray having a base platform 56, raised side-guide-rails 58 and rear hook-shape stops 60. Tab 54 is raised from the plane of the base of tray 56 to form an integral rear-facing catch 62 adapted to engage the front lip 24 of a CD-case 10. Thus, side-guides 58, rear stops 60 and front catch 62 act together to releasibly retain a CD-case in accurate location (in all directions) on carrier 52. Short, upstanding side walls 64 are formed at the rear of carrier tray 56 to support the carrier in cantilever fashion from guide rails 50. A small tapered protrusion or detent 66 is formed on the outer face of each wall 64 to provide a positive stop to limit the rearward movement of the carrier 52 within its rails 50, thereby defining the storage position of carrier 52 within cabinet 42.

The forward end 64a of each side wall 64 is inset slightly (so as to be aligned with the corresponding side guide rail 58) and carries a short horizontal trunnion 68 positioned so that the axis of both trunnions coincides with the hinge-axis (21, FIG. 1) of a CD-case loaded in and retained by the carrier. A pair of side-arms 70 joined together by a cross-bar 72 are pivotally mounted on trunnions 68. Side-arms 70 and cross-bar 72 are preferably injection-moulded from a resiliently flexible plastics material, the front portions of the side-arms being free to flex laterally to accommodate the rear end of a CD-case therebetween. A protrusion 74 is formed on the inside face of each side-arm 70 near its forward end for engaging the corresponding rear side-slot 36 of lid 12 of CD-case 10a and, as most clearly seen from FIG. 4, has a curved shape to facilitate its entry into and exit from slot 36. FIG. 4 shows a CD-case 10 being loaded into a carrier 52 (which may be in the storage position or partially withdrawn from cabinet 42 but is not in the access position) by sliding case 10 (with its lid 12 closed) rearwards into carrier 52 between side-guides 58. After the sides 17 of lid 12 enter between side-arms 70, they contact protrusions 74 which (by virtue of their curved shape) flex side-arms 70 outwards as shown in broken lines at 70a so that protrusions 74 ride up on the sides of the lid of the CD-case. Further rearward movement of case 10 brings slots 36 into alignment with protrusions 74, causing the protrusions to enter the slots and allowing side-arms 70 to flex back to their normal positions. At this point, rear face 27 of case 10 abuts rear stops 60 allowing the front of CD-case 10 to be pressed down flat onto tray 56 so that catch 62 snaps over body-lip 24 of case 10 (FIG. 3) thereby retaining case 10 on carrier 52. When it is desired to remove the case, tab 54 is torsionally rotated forwards and downwards to disengage catch 62 from lip 24 and to allow the case to be raised so that its front face clears tab 54, whereupon it can be pulled forwards until it comes out from under the hooked portion of stops 60. Again, because of the shape of protrusions 74, this action causes side-arms 70 to flex outwards (to positions 70a) automatically disengaging protrusions from slots 36. Preferably, carrier tray 56 is also formed from resiliently flexible material so that engagement and release of catch 62 is facilitated by deflecting the front of tray 56 downwards. Such deflection also enables the lid of a CD-case loaded in the carrier to be sprung open if it is tight on the body of the case.

Figure 5:
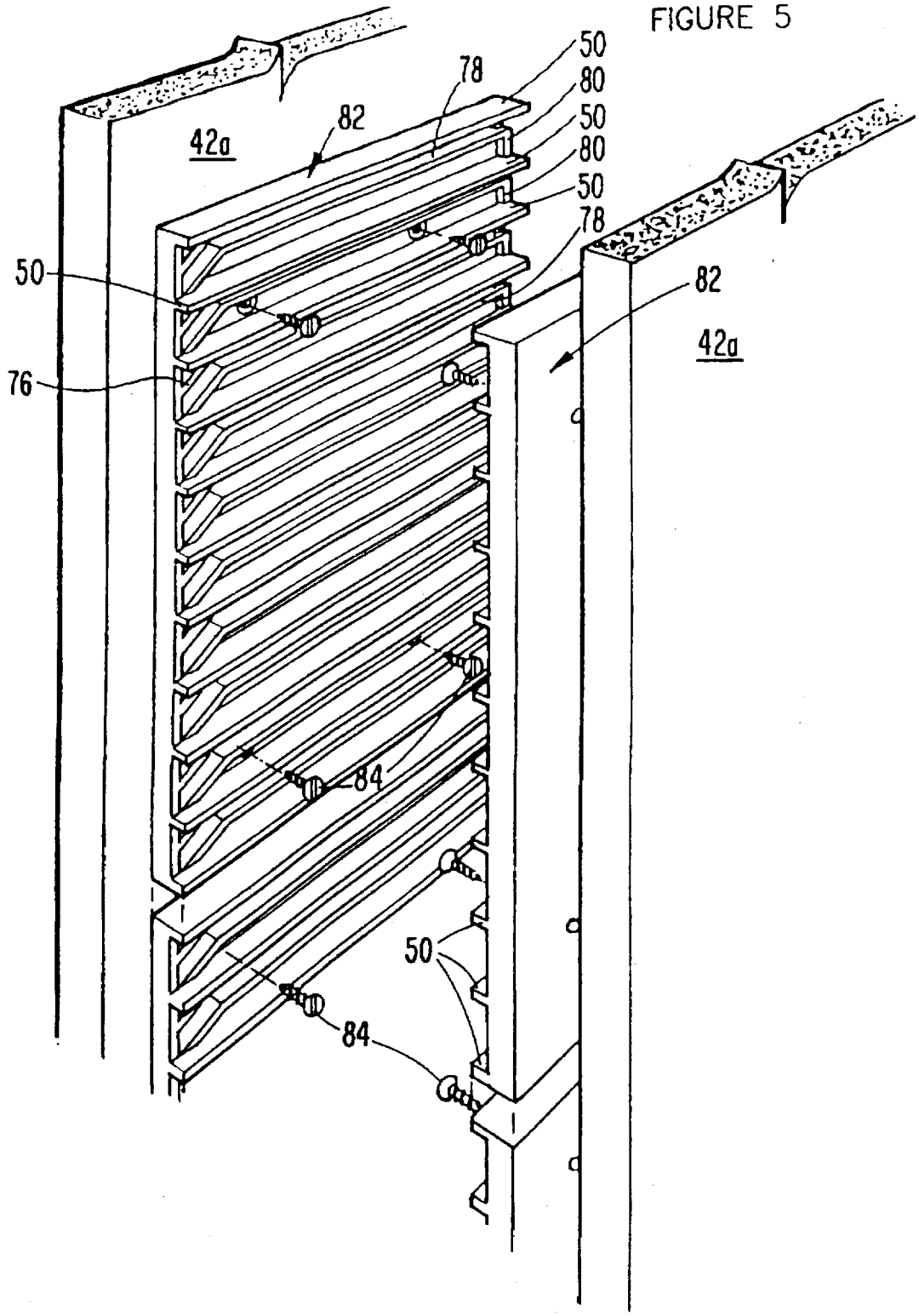
FIG. 5 is a cut-away and exploded perspective indicating an alternative way in which the guide rails may be formed and attached to a frame.

The above-described engagement of lid 12 of CD-case 10 by side-arms 70, and the pivoting of the side-arms about the hinge axis of a case loaded in and retained by a carrier (the hinge-axis being coincident with the axis of trunnions 68), allows side-arms 70 to be used to effect the automatic opening of the case lid 12 when the carrier is pulled forward to its access position using tab 54. This is achieved in this example by contact between a striker-pin 75 on the rear end of each side-arm 70 and a coacting ramp-like abutment 76 extending downward and forward from beneath the front end of each rail 50, the striker-pin 75 extending laterally and horizontally from the external side face of the associated side-arm 70 at a position which is above and to the rear of the trunnion axis. A second ramp 77 is spaced parallel to and below each ramp 76 at the front of cabinet 42, as shown in FIG. 3. Ramps 77 serve to engage striker pins 75 of carrier 52 to forcibly close the lid of a CD-case held within the carrier as the carrier is returned rearward from the access position. It is convenient to continue the top of each ramp 76 and each ramp 77 rearward to the back of cabinet 42 so that they form shallow side rails 78 between each pair of guide rails 50, side rails 78 serving to locate the carrier laterally (by sliding abutment with carrier tray side faces 64) when the carrier is moved forwards and backwards between the access and storage positions; the carrier being located vertically during this movement by guide rails 50. In FIGS. 3 and 5, only the shallow side rail 78 which extends rearward from the top of ramp 77 is visible, the side rail which extends rearward from the top of ramp 76 being obscured by the guide rail 50 which is immediately above it. As will be best seen from FIG. 5, the rear extremity of rail 78 terminates in a vertical stop-wall 80, it being this stop that detent 66 contacts to prevent the carrier from being inadvertently pushed rearwards out of cabinet 42; ramp 76 serving as stop means preventing the carrier from being removed from the cabinet in the forwards direction.

FIG. 5 shows how a CD-storage system of the type described above can be built into a pre-existing cabinet or frame. Here the cabinet sides 42a are formed from timber, chipboard or the like and separate injection-moulded side panels 82 incorporating rails 50, stop-ramps 76, rails 78 and stops 80 are secured in place to cabinet sides 42a with screws 84. In this case, panels 82 may be regarded as the frame means. The storage rack of FIG. 5 may be otherwise identical with that of FIGS. 1 to 4.

Figure 6:
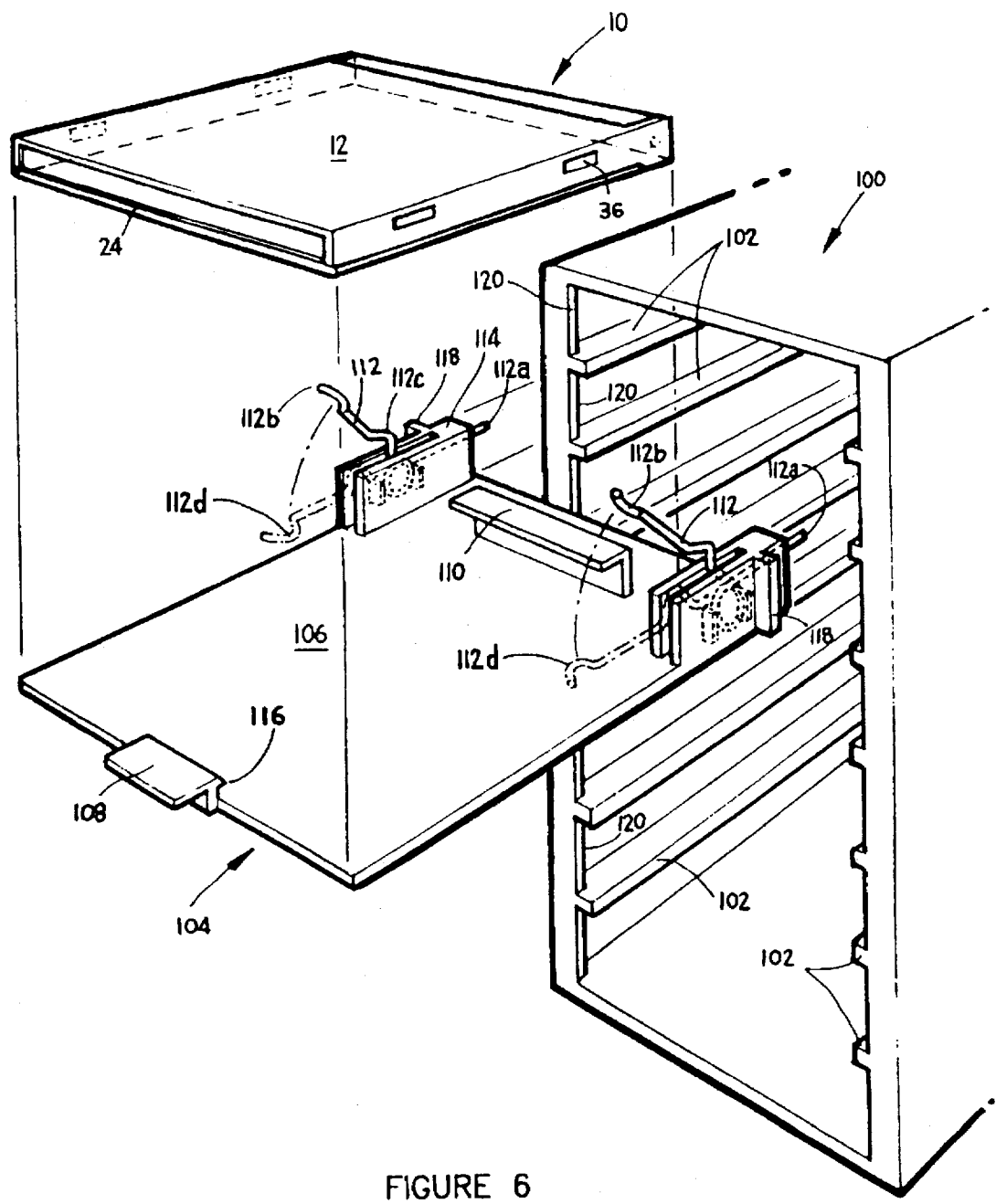
FIG. 6 is an exploded perspective of a second example of a carrier and its frame assembly.

A CD storage-rack illustrating the second example of a carrier is shown in FIG. 6 with the cabinet 100 being formed as described with reference to FIGS. 1–4 or 5. As before, the side walls of cabinet 100 have guide rails 102 formed on their internal faces and carriers 104 (only one of which is shown) are slidably mounted between each pair of adjacent guide rails 102, each carrier comprising a flat tray 106 having a central front combined tab and catch 108 for engaging the front lip 24 of a CD-case 10 and a back-stop 110 to locate the case on the tray. However, in this case, the side-arms which engage the sides of case 10 are formed by a pair of wire torsion springs 112 which are located in bifurcated housings 114 upstanding from each side of tray 106 at the rear thereof, springs 112 simply being slipped into the slots of housings 114 so that their rear ends 112a extend rearward there-through to hold their front ends 112b up in the position shown. The front end 112b of each spring 112 is bent inwards in a curved manner to form a protrusion that is adapted to enter rear side slot 36 of case lid 12. Spring arms 112 are also bent to form an upward kink 112c just forward of housings 114 so that, when carrier 104 is pushed into cabinet 100, kinks 112c engage the bottom of upper rails 102 to move arms 112 downwards to the horizontal positions as shown in broken lines at 112d. Finally, vertical wing-like abutments 118 are formed on the outside of housings 114 near the rear thereof for coaction with stops 120 formed across the front ends of the slots formed between rails 102.

The rack of FIG. 6 is assembled by sliding carriers 104 into their slots between rails 102 from the rear of cabinet 100. Each carrier (preferably in or near the storage position) may then be loaded with a CD-case by pushing the case rearwards on tray 106 so that it flexes arms 112 outwards (arms 112 being horizontal in position 112d as explained above), and then pressing the case home until it registers under and against stop 110 and protrusions 112b enter side slots 36 of the case lid 12. The front of case 10 may then be pressed down until its front lip 24 snaps behind catch 116 on tab 108. Since there will always be friction between the kinks 112c of arms 112 and the upper rail 102, each carrier and case will be retained in its storage position in the cabinet 100 without the need for separate detents (though these may be provided, if desired). However, inadvertent rearward removal of the carriers may be conveniently prevented by the use of a cabinet back panel (not shown), or in the manner described in respect of the first example.

Figure 7A:
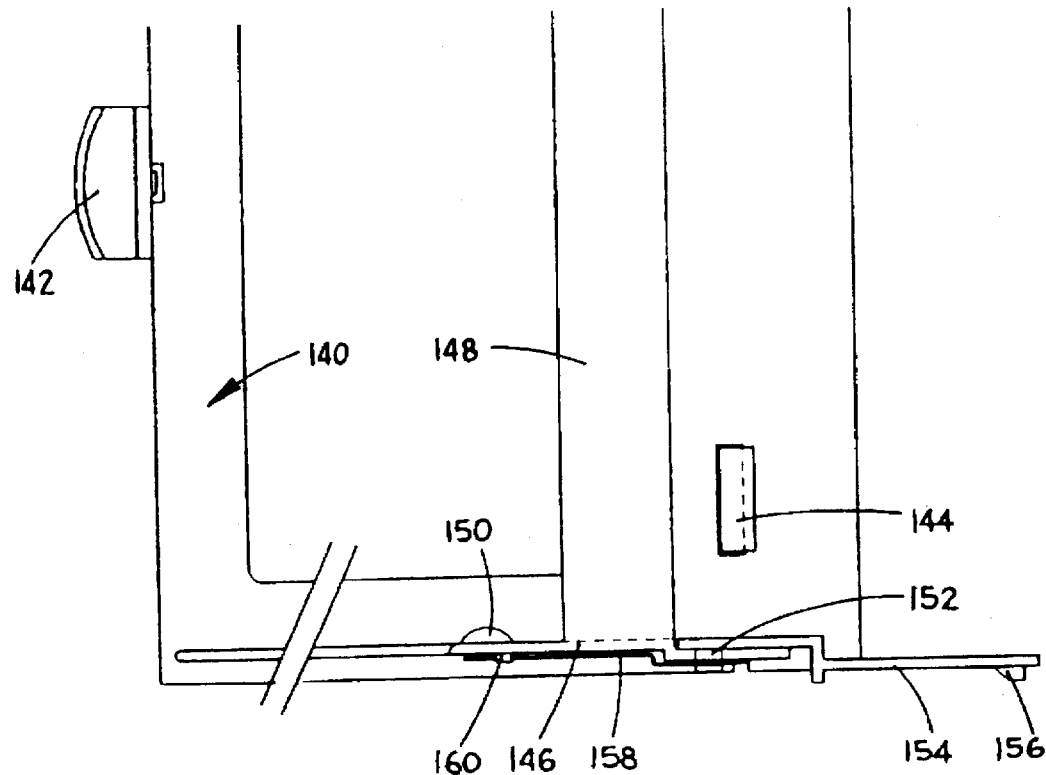
FIGS. 7A and 7B are, respectively, a partial plan and a side elevation of a third example of a carrier.
Figure 7B:
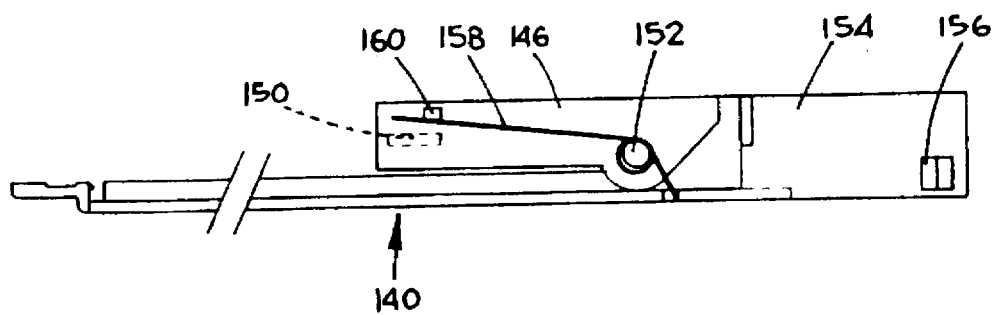

The third example of a carrier shown in FIGS. 7A and 7B is similar to that of the first example (FIGS. 1–4) except that, the striker-pins (75) and coacting ramps (76) of the first example are omitted. Instead, the side-arms of the carrier are simply spring-biased upwards so that the lid of a case retained by the carrier is biased open as in the second example. The carrier again comprises a tray 140 fitted with a central front combined tab and catch 142 and rear stops 144 for locating a CD-case 10, the pivoted side-arms are again joined by a cross-bar 148 and, like the first example, each arm 146 has a curved protrusion 150 on its inner face arranged to align with and engage the rear side-slot (36) of a CD-case (10), each arm 146 being pivoted on trunnion 152 formed on the sides 154 the tray (as in the first example). Rear stops or detents 156 are formed on sides 154 in the same manner and for the same purpose as detents 66 of the first example. A torsion-spring 158 is located on each trunnion 152 and has its front end hooked under a stop 160 on arm 146 so that the arm is biased upwards. The CD-case may be loaded in tray 140 when it is in the storage position as described in the first and second examples.

Figure 8A:
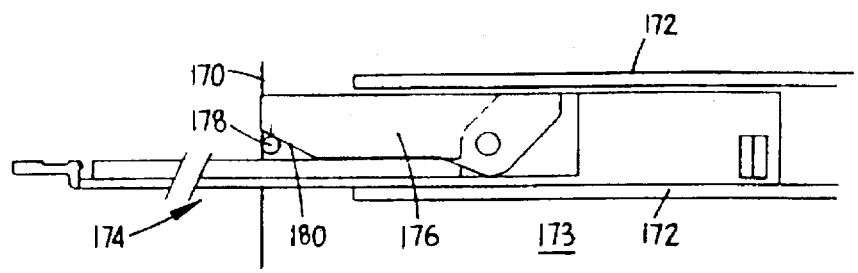
FIGS. 8A and 8B are partial side elevations of a fourth example of a carrier and its rails, FIG. 8A showing the carrier partially withdrawn and FIG. 8B showing it in the access position.
Figure 8B:
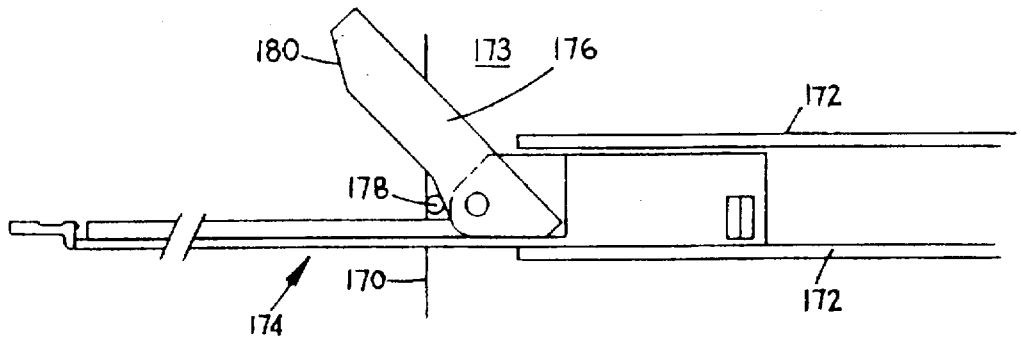

The fourth example of a carrier is illustrated in the diagrammatic elevations of FIGS. 8A and 8B which show the front face 170 and a pair of guide rails 172 of a suitable frame means or cabinet 173 and a carrier 174 in place between the rails. Carrier 174 may be substantially the same as that of the first example, except that side-arms 176 do not have striker-pins to raise them. Instead, a striker-pin 178 is fixed to the wall of cabinet 173 at or near front face 170 between rails 172, there being one pin 178 between each pair of rails 172 on each side of cabinet 173. Pin 178 protrudes sufficiently from the cabinet wall to contact the adjacent arm 176 but not sufficiently to contact a CD-case retained by carrier 174. The lower front edge 180 of arm 176 is sloped or curved so that the arm will rise up and ride over pin 178 as the carrier 174 is pulled toward the access position. FIG. 8A shows the carrier almost fully withdrawn from the cabinet at the point where arm 176 just makes contact with pin 178, while FIG. 8B shows carrier 174 in the access position after arm 176 has ridden upwards over pin 178 to effect the opening of a CD-case retained by the carrier.

Figure 9A:
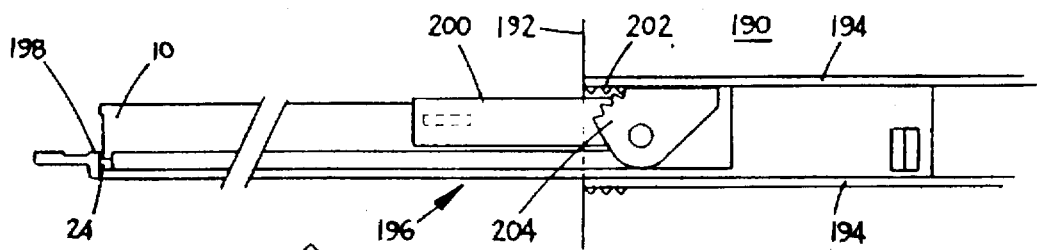
FIGS. 9A and 9B are similar views to FIGS. 8A and 8B of a fifth example of a carrier.
Figure 9B:
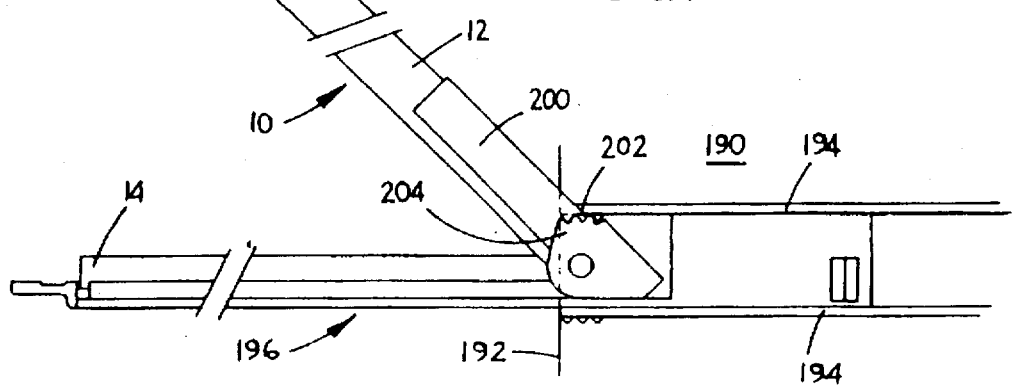

A fifth example is shown diagrammatically in FIGS. 9A and 9B (which are of a similar nature to FIGS. 8A and 8B), the cabinet or frame-means being generally indicated at 190, its front face at 192 and a pair of rails at 194 forming the guide means in this example as before. In this example, a CD-case 10 is shown in place in the carrier 196 with its front lip 24 engaged by the central tab/catch 198 of carrier 196 as previously described. As before, pivoted side-arms 200 form the lid-engaging means and engage the side-slots (36) in the lid 12 of CD-case 10 in the manner of the first example. However, in this example, a short section of toothed rack 202 is formed on the underside of the front end of the upper rail 194 to engage a toothed segment 204 formed on the arm 200 so that, as carrier 196 is pulled to the access position, segment 204 is brought into engagement with rack 202 (FIG. 9A) and, then, as the carrier is pulled further to the access position, segment 204 is rotated to effect the raising of arm 200 with the engaged lid 12 of CD-case 10. Since the body 14 of case 10 is held down by tab 198, it will not be raised from carrier 196 and the case will be opened to allow the CD (not shown here) to be replaced or removed.

Figure 10A:
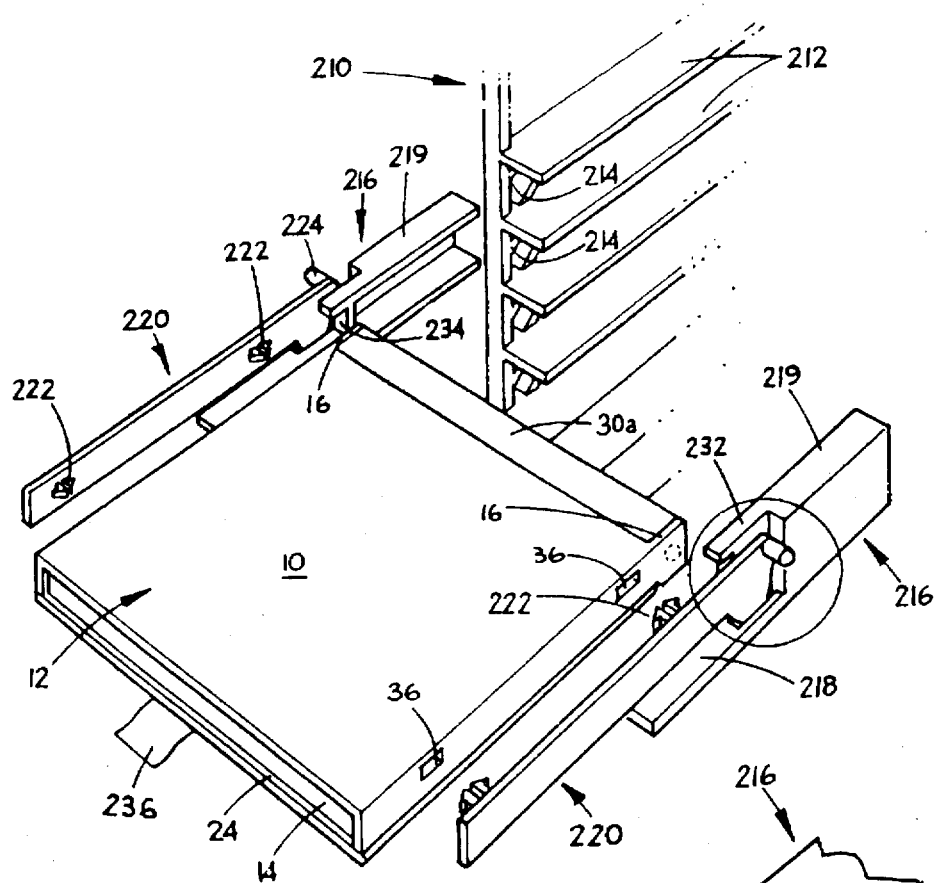
FIGS. 10A and 10B are, respectively, an exploded perspective and an enlarged detail of a sixth example of a carrier.
Figure 10B:
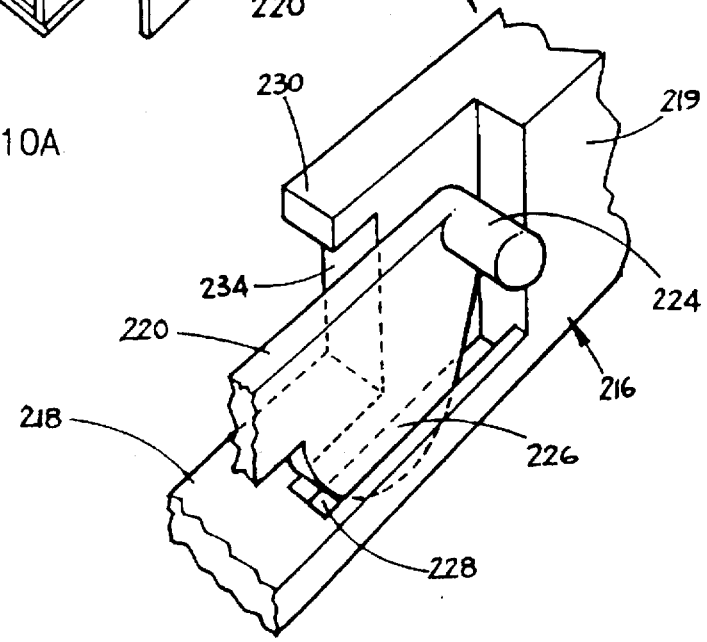

While it is generally convenient to pivotally mount the lid-opening means on a tray-like carrier as in the previous examples, the sixth example (showing in FIGS. 10A and 10B) shows that this is not essential and that cost savings may result if the carrier is split and one half is employed on each side of the CD-case. The frame means 210 and its guide means (rails 212) may be essentially as described with respect to the first example, sloping ramp-like abutments 214 being provided between the rails at their forward ends as before. However, a pair of elongate carrier-halves 216 are employed, one for each side of the CD-case 10, the forward part of each carrier half 216 being formed by a flat tongue 218 and the rear part by a rectilinear enlargement 219 shaped to fit neatly between adjacent rails 212 for sliding movement. The side arms 220 extend for substantially the full length of the CD-case and have two sets of protrusions 222 on their inner faces which are adapted to snap into slots 36 of CD-case 10 so that the arms are positively attached to the sides of the CD-case. While each arm 220 has a laterally extending striker-pin 224 to engage the corresponding ramp 214 to open the CD case in the manner of the first example, arms 220 are not pivoted to or otherwise positively mounted on their respective carriers 216. Instead, each is located on its carrier by entering a curved lug 226 that depends from its rear end into a slot 228 in the tongue 218 of the carrier half 216. The rear corner of the body 14 (or of the rear corner of insert surface 30a) of CD-case 10 is frictionally engaged under lip 230 at the front end of the enlargement 219 of the carrier half 216. A vertical web 234 supports lip 230 and forms a rear-stop against which the back of the CD-case is located. Finally, a self-adhesive tab 236 is stuck to the bottom of the case so that it can be pulled from the cabinet to the access position.

Figure 11:
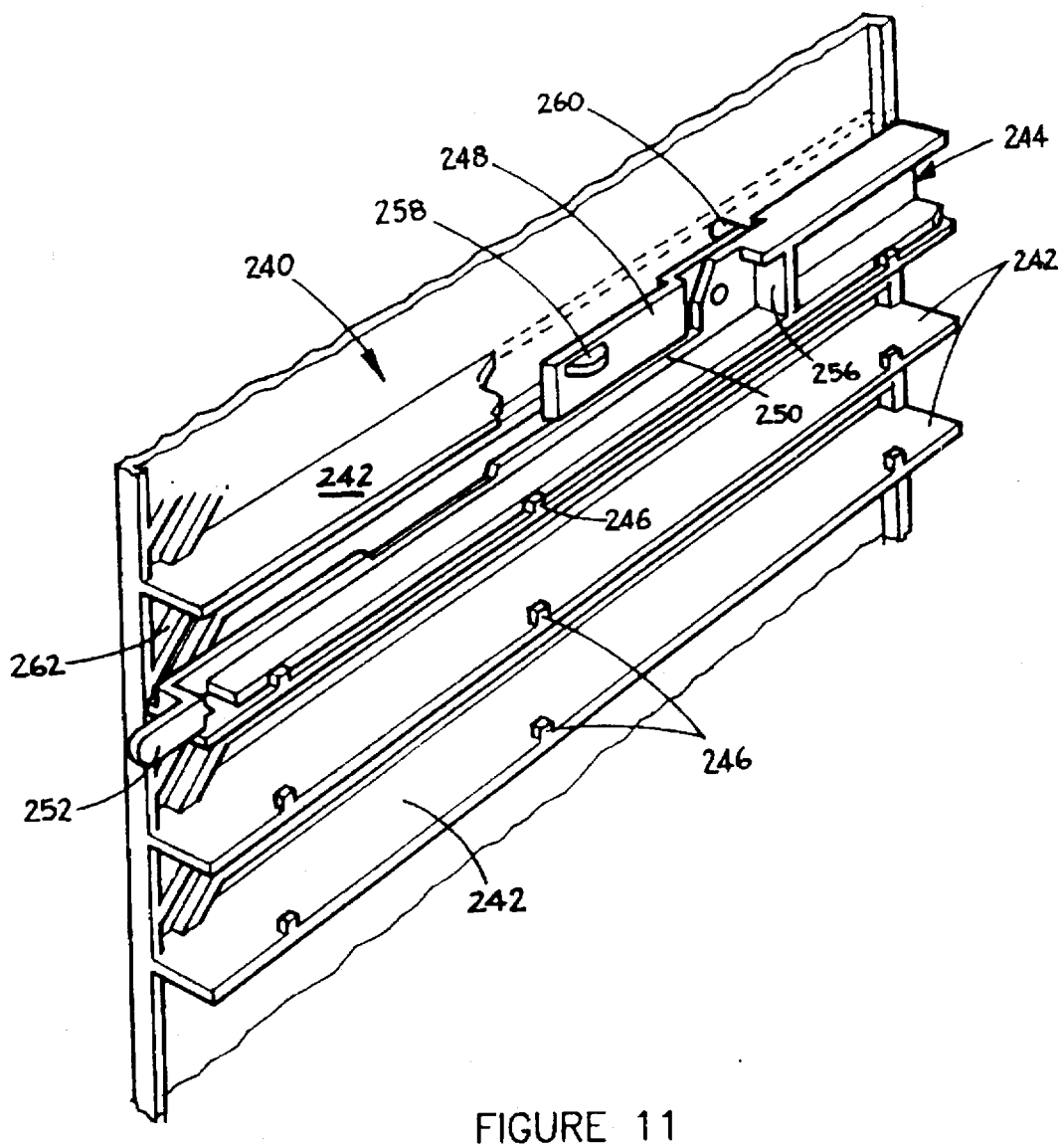
FIG. 11 is a perspective of part of a set of guide-rails and with the seventh example of a carrier in place.

The seventh example, shown in FIG. 11, combines features from the last example with those of earlier ones. Here the cabinet 240 and guide rails 242 are essentially the same as the first and sixth examples and the split carriers 244 are similar to those of the last example. However, upstanding from the inner edge of each rail 242 are three short carrier-retaining lugs 246 which prevent the half-carriers from falling out of their positions into the bottom of the cabinet. Each lid-opening side-arm 248 is of a similar form to those of the first example and is pivoted to its carrier 244 in a similar manner, except that the two side-arms are not linked together by a cross-bar. While carrier 244 has the same general shape as in the last example, it extends forwards for the full length of the CD-case and, besides supporting the case from beneath the side edge, has a low outer wall 250 which locates the case laterally. Indeed, side wall 250 is carried around the front corner of the CD-case and forms a combined thumb-tab and catch 252 adapted to engage the front lip (24) of a CD-case (10). As in the previous example, the enlarged rear of each carrier 244 is formed with a vertical web 256 which acts as a back-stop against which the back of the CD case is located. Each arm 248 has a curved inner protrusion 258 for engaging a side slot (36) of case (10) and has an outwardly extending striker-pin 260 at its rear end for coacting with the ramp 262 between rails 242 to effect the automatic raising of arm 248 (and the case-lid of CD-case is loaded in place) when carrier 244 is pulled out to the access position. In this example, the cabinet 240 may be supplied with the carriers assembled in position between each pair of guide rails 242 so that a CD-case can be loaded simply by pushing it into place, springing arms 248 and tabs 252.

Figure 12A:
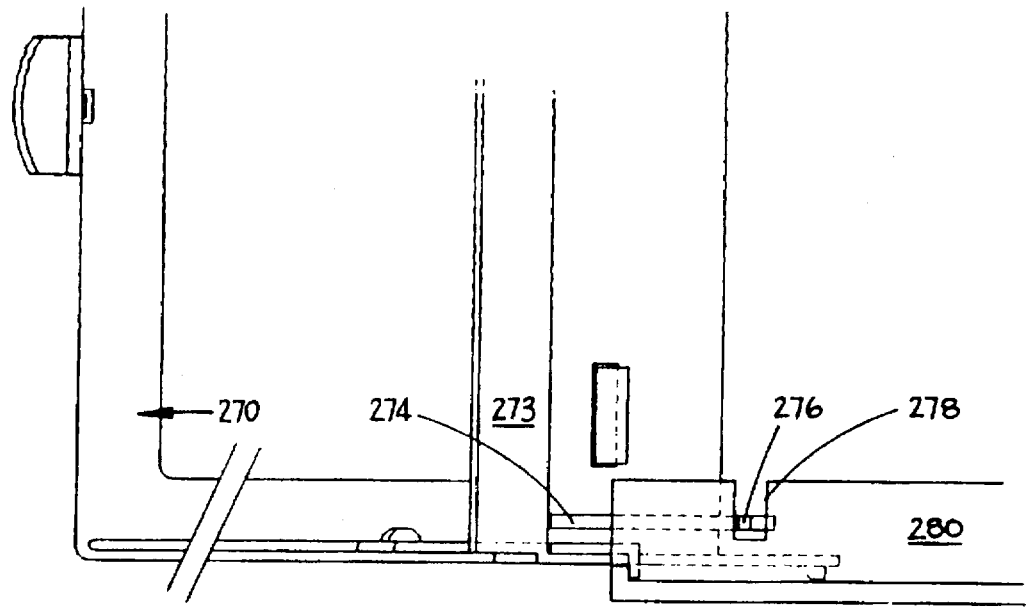
FIGS. 12A, 12B and 12C are, respectively, a plan and two side elevations of an eighth example of a carrier, FIG. 12C showing the carrier near its access position and FIG. 12A and 12B showing the carrier in its access position.
Figure 12B:
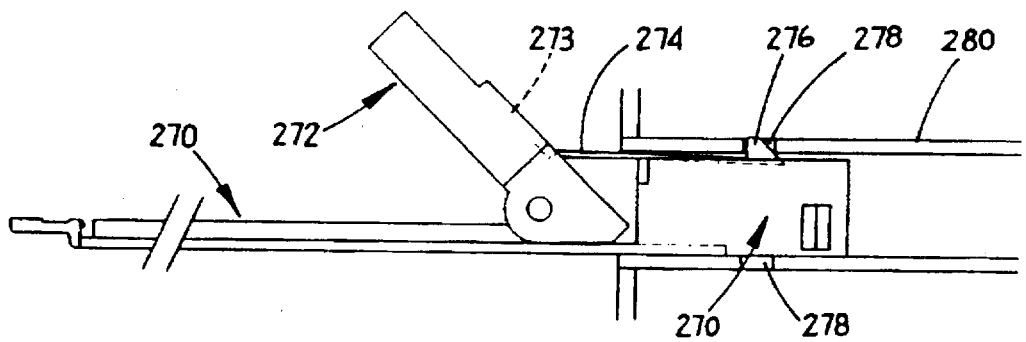
Figure 12C:
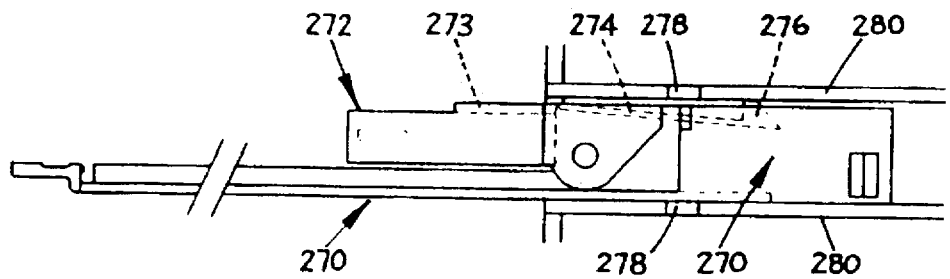

In the eighth example shown in FIGS. 12A–C, the tray-like one-piece carrier 270 and the pivoted side-arms 272 are essentially the same as in the first example, side-arms 272 also being joined by a cross-bar 273 in the same manner as in that example. However, the mechanism for raising arms 272 when the carrier is drawn to its access position differs. Here, a resilient trailing strap 274 is attached by its forward end to cross-bar 273 on each side near the associated arm 272, strap 274 terminating at its rear end with an upwardly facing hook 276. As shown in FIGS. 12A and 12B, hooks 276 engage with corresponding holes or slots 278 (formed in guide-rails 280 near the front ends thereof) when the carrier is withdrawn from its rails toward its access position, thereby pulling cross-bar 273 and arms 272 upwards. FIG. 12C shows carrier 270 before hook 276 engages slot 278 so that arms 272 are lowered. Insertion of a CD-case in carrier 270 is performed as described for the first example.

Figure 13:
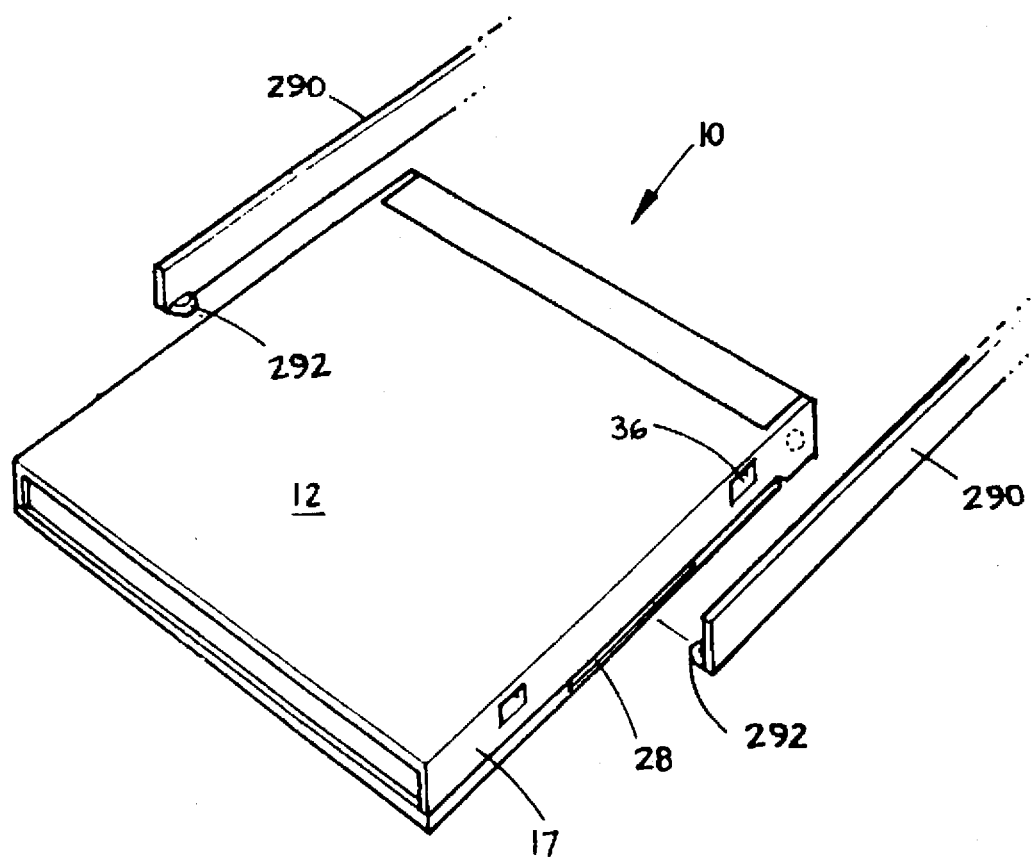
FIG. 13 is a perspective view of a CD-case and an alternative configuration of the side-arms which may be employed in any of the previous examples.

FIG. 13 illustrates an alternative method of engaging the side-arms 290 with the sides 17 of the lid 12 of a CD-case 10 which does not require side slots 36. Here, arms 290 extend to the centre of the case 10 and carry thin inwardly-facing protrusions 292 on their lower front corners which fit under sides 17 of case-lid 12 so as to extend into (or at least toward) cutaway 28 of case 10. Depending upon the detailed design of the CD-case, protrusions 292 may be able to automatically position themselves (when a case is loaded as described in previous examples) into the gap between the lower edge of case-lid 12 and body 14 without lifting the lid at all. With some case designs, however, it may be necessary to manually press arms 290 together to enter protrusions 282 under sides 17, thereby raising lid 12 slightly.

Figures 14A, 14B:
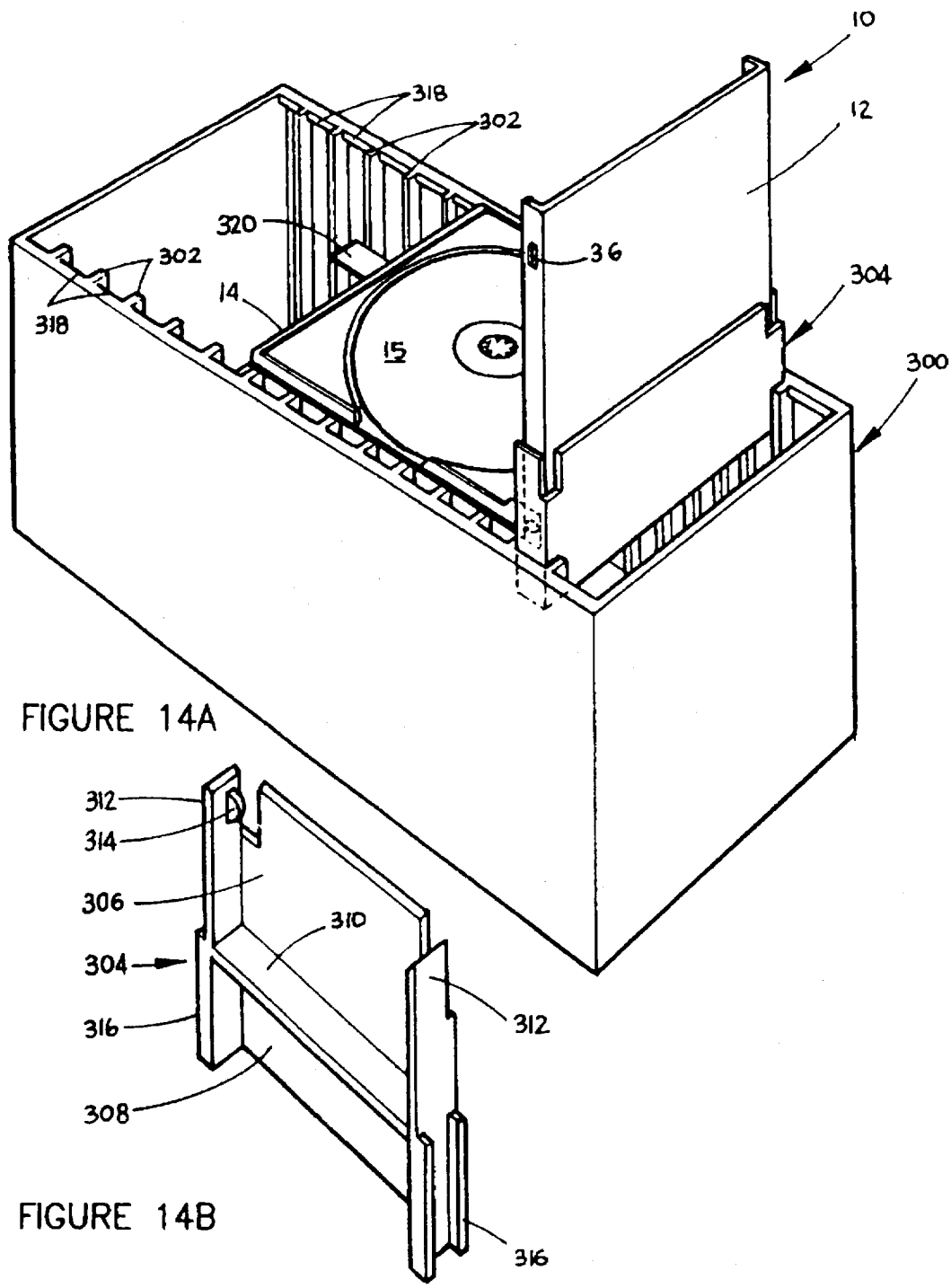
FIGS. 14A and 14B are, respectively, perspective views of a horizontal CD-rack and its carrier.

The final example of a CD-rack formed in accordance with this invention is a horizontal rack in which CD-cases are stored vertically as shown in FIGS. 14A and 14B. Here the cabinet 300 is provided with internal vertically disposed rails 302 which serve as the guide means, but the carriers 304 are arranged to retain the lid 12 of a CD-case 10 rather than the body 14. Each carrier 304 comprises an upper tray 306 and a lower tray 308 separated by a horizontal web 310 which forms a rear-stop for the back face of a CD-case. The upper ends of the sides 312 of upper tray 306 are cut away from the base of the tray so that they can flex, each side 312 having a protrusion 314 formed on its inner face to engage a side slot 36 of the CD-case; the sides 312 of this embodiment thereby forming the side-arms. Thus a (closed) CD-case 10 is simply loaded into carrier 304 by pushing it down into tray 306 with the face of lid 12 flat against the base of the tray 306, forcing sides 312 to flex outwards until protrusions 314 can snap into the nearest slots 36. The sides of the lower tray 308 of carrier 304 are formed as out-turned channels 316 to provide a larger bearing area for engagement with rails 302 and to space side-arms 312 from the sides of cabinet 300 so they can flex when a CD-case is inserted or removed. The carriers 304 are loaded into cabinet 300 from the lower face and cannot be withdrawn from the upper face because of the abutment of the tops of channels 316 with narrow lips 318 formed across the top ends of the channels between rails 302.

As shown in FIG. 14A, a carrier is pulled up to the access position and the body 14 of its CD-case 10 is folded down onto the top of the cabinet (and other CD-cases in their carriers) to open the case and provide access to the CD 15. Of course, rails 302 can be made to extend inwards sufficiently to support the body of a CD-case when it is folded down. The lifting and opening of case 10 may be facilitated by the use of an adhesive loop or tab 320 of the type indicated with reference to FIG. 10A.

While a range of examples of application of the principles of the present invention have been described, those skilled in the art will appreciate that many others may be devised, and that many modifications may be made to each of the CD-racks and carrier designs herein disclosed, without departing from the scope of the following claims. For instance, in all the examples the carrier guide means have been formed by guide rails in the sides of the frame means, but it will be appreciated that it is a simple mechanical equivalent to use guide slots instead, whether they be formed in the frame means or in the sides of the carriers. Similarly, a number of examples employed cross-bars which joined the side-arms together, but in most if not all cases the cross-bars may be omitted with little detriment to performance. Also, those skilled in the art will appreciate that the trailing-hook mechanism of the eighth example (FIGS. 12A–C) can be used to raise the side-arms of most other examples instead of the actuating mechanisms described. For example, the striker-pins of side-arms 220 of the sixth example (FIGS. 10A and 10B) may be omitted and the trailing-hook arrangement substituted. It will also be appreciated that the 'vertical' racks of all examples, except the last can be operated in the horizontal position, the terms vertical and horizontal being relative and used as a matter of convenience. Also as indicated earlier, it is not essential to use protuberances on the side-arms which engage the side slots on the CD-cases as the side arms can be sprung to engage the sides of the cases with friction pads or the like. These and many other variants are possible.

What is claimed is:

1. A CD storage rack comprising:
   a frame;
   a plurality of carriers each adapted for storage of a CD-case, each of said plurality of carriers being slidably mountable within said frame for movement between a back storage position and a front access position, each of said plurality of carriers having
      a support tray adapted to support a CD-case so that a hinge of the CD-case is positioned toward a back portion of an associated carrier, and
      two parallel, strip-like side-arms each having a front end and a rear end, each of said side-arms being mounted on said support tray by said rear end for pivotal movement about a pivot axis which is substantially coincident with an axis along the hinge of a CD-case supported by said support tray, said side-arms extending in a front-to-back direction and being resiliently flexible in a side-to-side direction, said side-arms being spaced apart and adapted to resiliently engage the sides of a lid of a CD-case loaded in said associated carrier, said side-arms being pivotable between a first position corresponding to the position of the lid of a closed CD-case loaded in said associated carrier and a second position corresponding to the position of the lid of an open CD-case loaded in said associated carrier; and arm operating means operatively connecting said side-arms and said frame of said storage rack to pivot said side-arms to said second position to effect automatic opening of a CD-case loaded in said associated carrier upon said associated carrier moving to said front access position.

2. A CD storage rack according to claim 1, wherein said support tray and said side-arms are adapted to receive and accommodate a closed CD-case as the closed CD-case is loaded into said carrier from a front side of said frame when said associated carrier is in said back storage position and said side-arms are in said first position, said side-arms resiliently engaging the sides of the CD-case during loading.

3. A CD storage rack according to claim 2 wherein:

each of said side-arms has an inner face and an inwardly-facing protrusion formed on said inner face near said front end of each of said side-arms;

said protrusion is adapted to enter a side slot in the lid of a CD-case as the CD-case is loaded into said associated carrier in said back storage position;

said protrusion has an angled front portion so that, during loading of the CD-case, said protrusion is adapated to ride over a back corner of the CD-case to thereby flex an associated side-arm outward to allow said protrusion to ride along the associated side of the lid of the CD-case until said protrusion engages a side slot in the lid of the CD-case; and said protrusion has a back portion adapted to ride out of the side slot in the lid of the CD-case as the CD-case is unloaded from said associated carrier.

4. A CD storage rack according to claim 2 wherein:

each of said side-arms has an inner face and an inward-facing protrusion formed on said inner face at or near said front end of each of said side-arms;

said protrusion is adapted to enter under an edge of the lid of a CD-case as the CD-case is loaded into an associated carrier in said back storage position;

said protrusion has an angled portion so that, during loading of the CD-case, said protrusion is adapted to ride over a back corner of the CD-case to thereby flex an associated side-arm outward to allow said protrusion to ride along and under the edge of the lid of the CD-case; and said protrusion has a back portion adapted to ride out from under the side of the lid of the CD-case as the CD-case is unloaded by being pulled forward from said associated carrier.

5. A CD storage rack according to claim 1 wherein:

each of said plurality of carriers is moveable horizontally between said back storage position and said front access position, each of said plurality of carriers and any CD-case loaded therein being supported in a cantilever-fashion from said frame when in said front access position;

said rear end of each of said side-arms has a striker pin formed above and rearwardly of said pivot axis so as to extend outwardly from an associated side-arm; and said CD storage rack further comprises first ramp-like abutments formed on each side of said frame at a front of said frame and in-line with said striker pin of each of said plurality of carriers, said first ramp-like abutments sloping downward and forward so that, as a selected carrier is drawn forward to said front access position, striker pins on corresponding ones of said side-arms of said selected carrier contact said first ramp-like abutments and deflect downward, thereby pivoting said corresponding side-arms to said second position and automatically opening a CD-case loaded in said selected carrier; and said arm operating means comprises said striker pins and associated ones of said first ramp-like abutments.

6. A CD storage rack according to claim 5 wherein:

said CD storage rack further comprises second ramp-like abutments formed on each side of said frame at said front of said frame below and parallel with said first ramp-like abutments so that respective striker pins of a respective carrier are withdrawn to said front access position travel between said first ramp-like abutments and said second ramp-like abutments; and as said respective carrier moves rearward from said front access position, said striker pins on said respective side-arms engage a corresponding one of said second ramp-like abutments and are deflected upward, thereby pivoting said respective side-arms to said first position and automatically closing the lid of a CD-case loaded in said respective carrier.

7. A CD storage rack comprising:

a frame;

a plurality of carriers each adapted for storage of a CD-case, each of said plurality of carriers being slidably mountable within said frame for movement between a back storage position and a front access position, each of said plurality of carriers and any CD-case loaded therein being supported in a cantilever-fashion from said frame when in said front access position, each of said plurality of carriers having a support tray adapted to support a CD-case so that a hinge of the CD-case is positioned toward a back portion of an associated carrier, and two parallel, strip-like side-arms each having a front end and a rear end, each of said side-arms being mounted on said support tray by said rear end for pivotal movement about a pivot axis which is substantially coincident with an axis along the hinge of a CD-case supported by said support tray, said side-arms extending in a front-to-back direction and being resiliently flexible in a side-to-side direction, said side-arms being spaced apart and adapted to resiliently engage the sides of a lid of a CD-case loaded in said associated carrier, said side-arms being pivotable between a first position corresponding to the position of the lid of a closed CD-case loaded in said associated carrier and a second position corresponding to the position of the lid of an open CD-case loaded in said associated carrier; and an arm operating mechanism operatively connecting said side-arms and said frame of said storage rack to pivot said side-arms to said second position to effect automatic opening of a CD-case loaded in said associated carrier upon said associated carrier moving to the front access position, wherein said rear end of each of said side-arms has a toothed-segment formed thereon above and around said pivot axis, said frame has a rack segment formed on a front side of said frame in line with each said toothed-segment of a corresponding carrier, so that, as said corresponding carrier is drawn forward to said front access position, said toothed-segment on each of said side-arms of said corresponding carrier engages a corresponding rack segment on said frame and rotates said toothed-segment to raise said front ends of said side-arms to automatically open a CD-case loaded in said corresponding carrier, and said arm-operating mechanism comprises said toothed segment and said rack segment.

8. A CD storage rack comprising:

a frame;

a plurality of carriers each adapted for storage of a CD-case, each of said plurality of carriers being slidably mountable within said frame for movement between a back storage position and a front access position, each of said plurality of carriers and any CD-case loaded therein being supported in a cantilever-fashion from said frame when in said front access position, each of said plurality of carriers having a support tray adapted to support a CD-case so that a hinge of the CD-case is positioned toward a back portion of an associated carrier, and two parallel, strip-like side-arms each having a front end and a rear end, each of said side-arms being mounted on said support tray by said rear end for pivotal movement about a pivot axis which is substantially coincident with an axis along the hinge of a CD-case supported by said support tray, said side-arms extending in a front-to-back direction and being resiliently flexible in a side-to-side direction, said side-arms being spaced apart and adapted to resiliently engage the sides of a lid of a CD-case loaded in said associated carrier, said side-arms being pivotable between a first position corresponding to the position of the lid of a closed CD-case loaded in said associated carrier and a second position corresponding to the position of the lid of an open CD-case loaded in said associated carrier; and an arm operating mechanism operatively connecting said side-arms and said frame of said storage rack, said arm operating mechanism being provided to pivot said side-arms to said second position to effect automatic opening of a CD-case loaded in said associated carrier when said associated carrier moves to the front access position, said arm operating mechanism comprising a flexible rearwardly-extending strap attached to at least one of said side-arms of each of said plurality of carriers at a position above said pivot axis, said strap having a rear end and a hook thereon;

a slot fixed near a front side of said frame and in line with said hook so that, as a respective carrier moves toward said front access position, said hook engages said slot and raises said front end of a respective side-arm to effect opening of a CD-case loaded within said respective carrier.

* * * * *